Patented Nov. 6, 1934

1,980,118

UNITED STATES PATENT OFFICE 1,980,118

PROCESS FOR RESOLVING EMULSIONS

Chaplin Tyler, Wilmington, Del., assignor to E. I. du Pont de Nemours & Company, Wilmington, Del., a corporation of Delaware No Drawing. Application July 18, 1931, Serial No. 551,803

6 Claims. (Cl. 196—4)

This invention relates to a process for resolving water-oil emulsions and particularly to a new composition for the resolution of such emulsions.

In the petroleum industry water-oil emulsions are frequently encountered both in the field and in the refinery and are responsible, to no inconsiderable amount, for part of the production costs. Various means have been proposed for "dehydrating" these emulsions, for instance, by chemical, electrical, and centrifugal treatments which have been employed with more or less success. This problem, however, is not peculiar to the petroleum industry, as emulsions are often encountered during the treatment of coal tar oils, animal and vegetable oils.

The object of my present invention is to provide a novel and inexpensive process for separating water-oil emulsions. Other objects of this invention are,—to provide a method for the treatment of so-called "roily" or "cut" petroleum oils, whether crude or refined, in order to separate the water therefrom; to provide a simple but effective method of removing the water from oil-field emulsions and further to provide a composition which, upon addition to water-oil emulsions, quickly and efficiently resolves them into their components. Other objects will hereinafter appear.

I have found that water-oil emulsions can be resolved into their constituents by the addition of a substantially water insoluble alcohol and particularly the water insoluble aliphatic alcohols of, say, 4, 5, 6, 7, and 9 carbon atoms and higher, or mixtures thereof. An especially active de-emulsifying agent, comprising essentially a mixture of the higher molecular weight water insoluble alcohols which is especially efficient, is the higher fraction of oxygenated organic compounds resulting from the catalytic hydrogenation of the oxides of carbon under high pressure. In the organic synthesis described in the patent of Roger Williams No. 1,820,417, a method of synthesizing such compounds is described. The organic compounds synthesized by this process cover a boiling range up to approximately 210° C. and include such alcohols as methyl, ethyl, propyl, butyl, amyl, hexyl, etc., the alcohols above ethyl having either straight or side-chain groupings. The fraction of this mixture which I prefer to use has a boiling range from approximately 100° C. to approximately 210° C. and consists of a mixture of these alcohols which is substantially water insoluble.

When treating oil-field emulsions with my deemulsifying agent, whether it be a mixture or a single alcohol, it may be introduced into the producing well in such a manner that it will become mixed with the water and oil as they emerge from the ground before said water and oil, as an emulsion or not, enter the well pump, or it may be added directly to the emulsion above the ground. After treatment the emulsion is allowed to stand in a quiescent state at a suitable temperature so as to permit the water, and in some cases, the brine, to separate from the oil, or it may be passed thru the various types of apparatus employed in this art for the breaking of petroleum emulsions. When treating emulsions of this type which generally contain a high percentage of water, it is sufficient to add approximately one barrel of my preferred deemulsifying agent which has a boiling range of approximately 100–210° C. to approximately 200–400 barrels of the emulsion. For the treatment of water-oil emulsions of other types it is usually sufficient to add approximately 0.5 to 2.0% of my composition to break the emulsion, although in some instances more and in other less is required. As the types of emulsions vary greatly, however, it will be understood that the proportions employed in any chemical operation will likewise vary,—no definite proportions being universally applicable.

Many types of water-oil emulsions may be broken by the employment of my deemulsifying agents. For example, they may be used to advantage for the breaking of emulsions which are encountered in the field and refinery of the petroleum industry. The oils obtained from the hydrogenation of coal sometimes emulsify during treatment; like difficulties are encountered during the purification of tar oils, and similar types of oils obtained in the coke oven industry,—likewise in the treatment of animal or vegetable oils for comestible or other uses. These and similar emulsions can be readily and efficiently resolved by the use of water insoluble alcohols or mixtures thereof in accord with this invention.

While my invention is directed primarily to the resolution of water-oil emulsions, it may, of course, be applied also to water-oil mixtures to prevent their emulsification. Petroleum wells often deliver a water-oil mixture which does not emulsify until it passes thru the pumps or other apparatus which more or less violently agitate it. By adding my deemulsifying agent before the mechanical or other treatment which causes it, the possibility of emulsion formation is greatly lessened and, if a sufficient amount be added, for the particular type of water-oil mixture usually encountered, entirely eliminated. Other similar applications of using my deemulsifying agent will readily suggest themselves to those skilled in this and analogous arts.

I claim:

1. A process for resolving emulsions which comprises adding thereto a mixture of alcohols having a boiling range from between approximately 100° C. and approximately 210° C., said alcohols having been obtained by the catalytic hydrogenation of a carbon oxide under high pressure.

2. The process of separating the constituents of a water-oil emulsion which comprises adding thereto a mixture of substantially water insoluble organic compounds obtained by the catalytic hydrogenation of a carbon oxide under high pressure.

3. A process for the prevention of the formation of water-oil emulsions which comprises having present in the water-oil mixture a mixture of alcohols having a boiling range from between approximately 100° C. and approximately 210° C., said alcohols having been obtained by the catalytic hydrogenation of a carbon oxide under high pressure.

4. A process for the prevention of the formation of water-oil emulsions which comprises adding to a water-oil emulsion a given quantity of a mixture of oxygenated organic compounds boiling above 100° C. obtained from the catalytic hydrogenation of carbon oxides under elevated temperatures and pressures.

5. In a process for the resolution of oil-water emulsions the step which comprises adding thereto from 0.5 to 2.0% of a mixture of water insoluble oxygenated organic compounds obtained from the catalytic hydrogenation of carbon oxides under elevated temperatures and pressures.

6. In a process for the resolution of oil-water emulsions the step which comprises adding thereto from 0.5 to 2.0% of a mixture of water insoluble alcohols boiling between approximately 100° C. to 210° C. and obtained from the catalytic hydrogenation of carbon oxides under elevated temperatures and pressures.

CHAPLIN TYLER.